May 21, 1946.   F. WEST, JR   2,400,582
NORTHERLY TURNING ERROR COMPENSATING MEANS
Filed Feb. 28, 1942
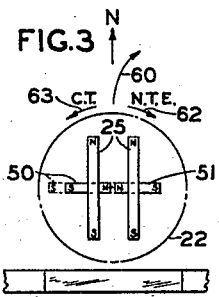
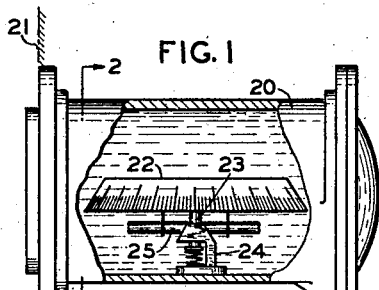
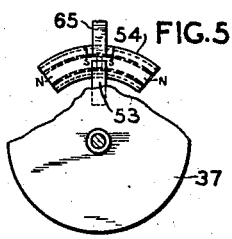
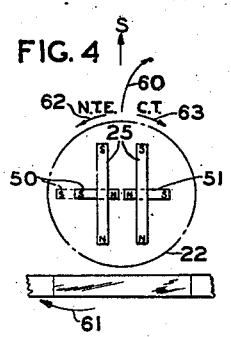
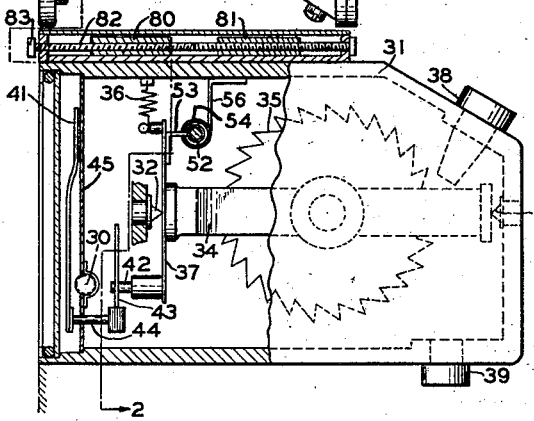
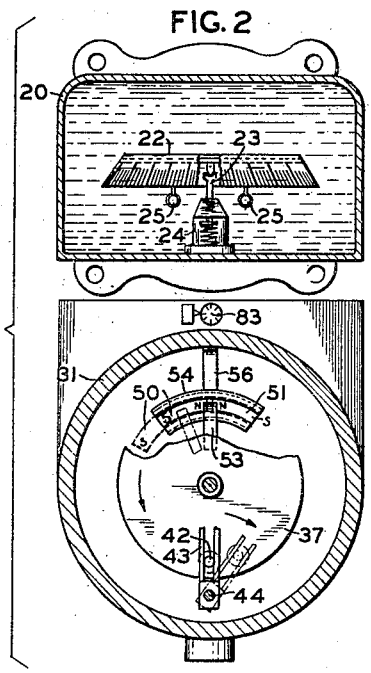
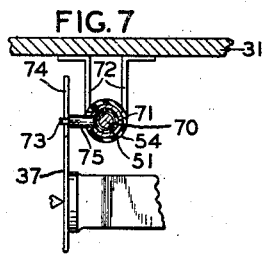
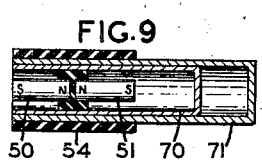
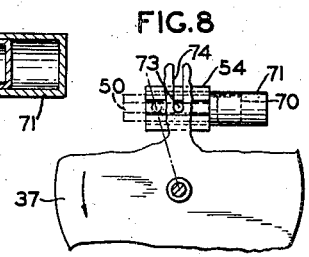
INVENTOR
FRANCIS WEST, JR.
BY
*Herbert V. Thompson*
HIS ATTORNEY Patented May 21, 1946

2,400,582

UNITED STATES PATENT OFFICE 2,400,582

NORTHERLY TURNING ERROR COMPENSATING MEANS

Francis West, Jr., Roslyn, N. Y., assignor to Sperry Gyroscope Company, Inc., Brooklyn, N. Y., a corporation of New York Application February 28, 1942, Serial No. 432,740

8 Claims. (Cl. 33—225)

This invention relates to means for compensating a magnetic compass against movement due to the so-called northerly turning error and more particularly to a magnetic linking element for exerting a corrective torque on the compass which is controlled by a gyroscopic turn indicator or other turn responsive device.

An object of the invention is, therefore, to obviate the error in the indication of a magnetic compass instrument due to turning of the craft from a straight course.

The main error in the magnetic compass due to this cause being a maximum for turns about a northerly course is usually termed the northerly turning error, the same resulting largely by reason of the pendulosity of the card of the compass instrument which renders it subject to centrifugal forces during turns or changes in velocity during straight line movement of the craft. The forces affecting the instrument at such a time cause the compass card to swing out of its normal horizontal plane, tilting the same so it is subject to a magnetic torque caused by the difference in direction between the N–S axis of the card and the projection of the earth's field in the plane of the tilted card. Such error affecting torque normally tends to rotate the compass card in the direction of turn of the craft when turning out of northerly courses.

Any course having a northerly component will exhibit such northerly turning error in the compass instrument upon turn of the craft, the error being at a maximum when the turn is made from a North heading. The error diminishes from this maximum to a negligible amount for turns of the craft made from an East or West heading. On courses having southerly components, the error is not as serious because a turn in the proper direction is always shown by the card of the compass instrument, the amount of the turn, however, being exaggerated in this instance. All such errors are however generally termed the northerly turning error. At the magnetic equator there is no northerly turning error inasmuch as there is no vertical component of the earth's magnetic field at the same.

One of the features of the invention resides in the utilization, with a magnetic compass instrument and turn responsive gyro instrument, of a normally ineffective magnetic means controlled by the gyro instrument and cooperating with the magnetic element of the compass instrument for compensating the compass against movement due to northerly turning error.

Another feature of the invention consists in the employment of shielding means for the magnetic compensating element which renders the same ineffective with respect to the compass unless actuated by the turn responsive device. As a consequence, an undesired corrective or compensating torque is not exerted by the element when the same is subject to forces resulting in inclination of the card as the vehicle changes attitude in bank, climb, or glide, during straight line movement.

A still further feature of the invention resides in the provision of a mounting structure for the error compensating element for the compass which provides a damping means for the rate of turn measuring gyro instrument.

Other objects, features and structural details of the invention will be apparent from the following description when read in connection with the accompanying drawing, wherein Fig. 1 is a side elevation view, partly in section, showing the combined magnetic compass and turn responsive gyro instruments and one form of the turning error compensating means employed therewith, the instruments being shown in spaced vertical relation and arranged on an instrument mounting panel.

Fig. 2 is a cross-section view taken on line 2—2 in Fig. 1.

Figs. 3 and 4 are schematic views illustrating the operation of an error compensated magnetic compass constructed in accordance with the teaching of the present invention.

Fig. 5 is a detail front elevation view showing a modified form of the invention for controlling the error compensating means from the gyro instrument.

Fig. 6 is a side elevation view of the detail modification shown in Fig. 5.

Fig. 7 is an enlarged detail side elevation view illustrating a further modification of the invention in which the compensating element is directly moved by the gyro instrument and the element forms a part of a mounting structure with which it also provides a damping means for the rate of turn measuring gyro instrument.

Fig. 8 is a front elevation view of the modified form of the invention shown in Fig. 7, and Fig. 9 is an enlarged longitudinal cross-section taken through the fixed cylinder and piston damping structure shown in Figs. 7 and 8.

With reference particularly to Figs. 1 and 2, the compensating means of the present invention is used in combination with a well known direction indicating instrument and an equally familiar turn responsive instrument. One of the instruments is a magnetic compass embodying the usual features which include a fluid containing enclosed case 20 that is suitably mounted on an instrument panel 21 in the vehicle with which it is employed. The front part of the case 20 has a window opening therein through which the indications contained on the periphery of a compass card 22 may be observed, with reference to a given lubber line, by the pilot or observer of the instrument. The compass card or sensitive element of the instrument is supported on a yieldably mounted jewel post 23 situated on a bracket forming piece 24 fixed in position within the interior of the enclosing casing 20. The circular compass card has diametrically positioned arms at the center of which is the usual pivotal mounting pin for the same which rests on the slightly concave top surface provided at the top of the jewel forming post 23. Two direction determining members or magnets 25 are preferably employed to position the card 22 in azimuth, the same being arranged in parallel relation and being suspended from the cross arms of the instrument on suitable straps. The jewel supported sensitive element of the compass is slightly pendulous so that the card and magnets are situated in a horizontal plane during normal straight line flight or travel of the vehicle or craft on which the instrument is mounted. Applicant does not claim the compass instrument, per se, the same being of conventional construction and being shown purposely as an integral unit which is controllable in accordance with the teachings of the present invention without the necessity of embodying or incorporating the same in a redesigned instrument case. Thus by completely shielding the described instrument from its controlling means, the same provides the usual magnetic compass instrument. It is apparent, however, that the compass may be contained within the same case as the instrument to be hereinafter described.

The second of the conventional instruments employed in connection with the present invention is a turn indicator. This well known instrument is mounted on the instrument panel 21 in spaced vertical relation to the compass instrument, the same, in this instance shown, being placed directly below the compass. A curved glass tube as indicated in section at 30 in Fig. 1 provides the bank indicating portion of this instrument, the tube containing a suitable damping fluid and a ball indicator therein. The turn indicator portion of the instrument is gyroscopically controlled. The moving parts of the instrument are housed within a casing 31 which provides a support for trunnions 32 and 33. The rotor bearing frame 34 of the provided gyroscope is mounted to precess about the axis defined by the trunnions 32 and 33. The gyro rotor 35 has a normal horizontal spin axis, the same being situated on a suitable shaft having ends which are journaled in oppositely disposed arms of the bearing frame 34. As is usual in a turn responsive gyro of this character, the frame 34 is normally centralized by means of a spring 36, one end of which is fixed to the casing 31 and the other end of which is connected to a pin which extends from a disc member 37 located at the left-hand side of the frame 34, as viewed in Fig. 1. The spin axis of the rotor 35 is perpendicular to the trunnion defined axis of the frame 34. Any suitable means may be employed to spin the gyro rotor 35. In this instance, the rotor is spun pneumatically, a nozzle piece 38 located in casing 31 being employed for this purpose by directing air upon the bucket containing periphery of the rotor. The air supplied the casing 31 by way of the jet directing nozzle 38 either under pressure or by vacuum is suitably withdrawn therefrom through the port 39.

When the vehicle on which the instrument is mounted turns to the right, the casing 31 moves correspondingly about a vertical axis, the frame and disc 37, Fig. 2, precessing in a counter-clockwise direction against the action of spring 36. The extent of this movement is dependent upon the rate of turn of the vehicle, the same being proportionally related. A turn of the vehicle in the opposite direction causes the disc to precess in a similar manner in a clockwise direction as viewed in Fig. 2. The direction and extent of such movement is indicated by means of a pointer 41 which is driven from disc 37 by way of a reversing motion mechanism which includes a pin 42 that engages a slotted member 43 which controls the rotation of a shaft 44. The pointer 41 is mounted to rotate with shaft 44, the same being further situated to the rear of a window opening in the front of the casing 31 and to the front of a mask 45 on which is contained a left, central and right indication against which the pointer may be compared by the observer of the instrument. The extent of movement of the pointer from a central position either to the right or left is a measure of the rate of turn of the vehicle as well as an indication of the direction of the turn. This instrument is of conventional construction and is employed in connection with the compass instrument in assisting the operator to navigate the vehicle on which both of the same are mounted.

In accordance with the teaching of the present invention the two described instruments are grouped together so that error compensating control of the compass may be effected. In Figs. 1 and 2, the magnetic element or means for exerting an error corrective torque on the compass is directly controlled by the turn responsive gyro instrument. This element consists of two curved longitudinally extending magnets 50 and 51 which are fixed in arcuate sleeve 52 that in turn is directly mounted on disc 37 by means of extending arm 53. The polarities of the magnets are opposed so that the south poles of each of the same, in this instance, are at the extremities thereof. The element moves with movement of the disc in response to the operation of the gyro instrument. Due to its centralized position, the means for magnetically linking the magnet pieces to the compass instrument is normally ineffective inasmuch as the same would exert equal and opposite turning torques on the compass. To insure the existence of this normally ineffective condition of the element during such occasions as variable speed straight line movement of the vehicle or when the vehicle is inclined to the horizontal, which would render the element effective when undesired because of tilt of the compass card with relation to the same, a shield member 54 is also provided having a curved slot through which the arm 53 extends. The shield member is in the shape of a curved concentric sleeve which normally covers the magnet elements 50 and 51, the ends of the elements 50 and 51 being substantially flush with the ends of the shielding sleeve. Shield 54 is fixed in position by means of a connecting arm 56 secured to the interior top portion of the casing 31.

In describing the operation of the compensating torque applying means of the present invention reference is first made to Fig. 3 in which, from the observer's point of view, the compass instrument indicates a North heading of the vehicle. A turn to the right as indicated by arrow 60, for example, is now taken by the vehicle. The case 20 of the compass moves correspondingly in the direction indicated at 61. The magnetic torque of the northerly turning error, as indicated by the arrow 62 tends to move the compass card in the same direction as the case. Where the rate of turn is rapid the movement of the card due to the northerly turning error may exceed the movement of the case so that an apparent turn to the left is indicated by the instrument. Upon turn of the vehicle in the direction selected the gyro rotor frame precesses and disc 37 moves in the counter-clockwise direction as viewed in Fig. 2 to an extent which is proportional to the rate of turn of the vehicle. A corresponding movement of the compensating element 50—51 is effected, the element moving out of its shield 54, as shown in both Figs. 2 and 3, to an effective position under control of the turn response gyro instrument. The extending south pole of the magnet 50 exerts a compensating torque whose direction is indicated at 63 which is immediately effective to resist movement of the card due to northerly turning error. By adjusting the strength of the magnets 50—51 and the distance of the same from the compass magnets 25, the compensating torque on the compass is made approximately proportional to the northerly turning error of the compass for any properly banked turn of the aircraft. A "properly banked turn" is one in which the resultant of the vectors of centrifugal and gravitational forces lies in the normally vertical axis of the aircraft, or one in which the ball bank indicator is always maintained in its central position. Once having been adjusted for any particular properly banked turn, magnets 50—51 will be of approximately the correct strength and position for any other degree of bank providing the aforesaid conditions are maintained. When the vehicle turns toward the left from this heading, directionally reversed conditions to those previously described affect the compass card and the same result is obtained. With reference to Fig. 4, movement of the vehicle in a South heading is shown and a turn is taken to the right, as indicated by arrow 60 out of this heading. In this event, the northerly turning error movement of the card, whose direction is indicated at 62, exaggerates the turn of the vehicle. The effective position of the compensating element is similar to that described in connection with Fig. 3, the torque resulting therefrom, however, being exerted in the direction shown at 63 which is in opposed relation to that of the northerly turning error. The normally ineffective compensating means which is rendered effective under the control of and in response to movement of the rate of turn measuring gyro instrument is magnetically linked to the compass instrument of the combination. The compass instrument is consequently compensated against movement due to northerly turning error.

In the form of the invention illustrated in Figs. 5 and 6, the shield 54 of the compensating element is moved by the disc 37 on the rotor frame of the gyro instrument. The curved sleeve forming shield is provided with a slot in the upper portion of the same through which an arm 65 extends from a fixed location within the casing 21 to support the magnets 50 and 51 in their sleeve retaining structure. The compensating element in this event is fixed and the shield or means for rendering the element normally ineffective is moved by the turn responsive gyro instrument. Because of the difference in relative movement of the associated parts in this form of the invention, it is also necessary to alter the relation of the magnets 50 and 51 so that the north poles are situated at the respective ends of the longitudinally arranged combined magnets, as shown.

With reference to Figs. 7 to 9, inclusive, a further modification is shown in which the compensating element is situated within a mounting structure therefor which provides a damping means for the gyro instrument. In this form of the invention the compensating element comprises magnets 50 and 51 which are situated in longitudinal relation in an axial position within a piston forming member 70 which reciprocates within a fixed cylinder 71. Shield 54 fits over the cylinder 71, which in the form shown is closed at one end only, both of these parts being mounted in a fixed position within the casing 31 by means of a bracket holding piece 72. An arm 75 is fixed to the wall of the piston 70 and extends through adjacent horizontal slots in both the cylinder and shield. A roller 73 at the end of the arm 75 engages a radial slot 74 in the disc 37 controlled by the turn responsive gyro instrument. Consequently the rotary movement of the disc 37 is converted by this construction into a translational movement of the compensating element with respect to its shield. The dash pot action of the piston within cylinder 71 also simultaneously provides for the damping of the oscillations of the gyro instrument.

In the previously described adjustment of the strength or position of magnets 50—51, in order to produce a correcting torque which is approximately equal to that of the northerly turning error, it was assumed that the angle of dip of the earth's magnetic field was a constant. If, however, the vehicle should change its latitude, it would encounter a change in the aforesaid angle of dip, which would result in an over or under-correction of the northerly turning error, according to the direction in which the change occurred. If the vehicle crosses the magnetic equator, it is necessary to reverse the polarities of magnets 50—51. Within the same hemisphere, it is necessary to amplify the correcting torque as the latitude is increased (in a direction towards the magnetic pole) and diminish as the latitude is decreased (towards the magnetic equator). To accomplish this correction for latitude a shielding plate, located between the compass and the rate of turn gyro, is adjusted until the proper amount of correcting torque is obtained. The shielding plate employed for this purpose is shown as formed by two relatively movable soft iron parts 80 and 81 which are situated on top of the turn indicator casing 31 in the present instance. The flux gap between the parts 80 and 81 is determined by means of screw shaft connection 82 for the parts in which there are right and left-hand threaded portions. Manual means for positioning the shaft 82 is provided by the scaled knob 83.

As many changes could be made in the above construction and many apparently widely different embodiments of this invention could be made without departing from the scope thereof, it is intended that all matter contained in the above description or shown in the accompanying drawing shall be interpreted as illustrative and not in a limiting sense.

What is claimed is:

1. The combination of, a magnetic compass, a turn responsive gyro instrument, and a movably mounted, normally ineffectively positioned, magnetic element movable by and in response to turn responsive movement of said gyro instrument to an effective position in which the same is magnetically linked to said compass, the extent of such movement providing a compensating torque for said compass which is approximately proportional to and opposed to the torque tending to cause northerly turning error of the compass for a particular turn thereof.

2. The combination with a magnetic compass of means for compensating for the northerly turning error effect of the vertical component of the earth's field on the magnetic, field-sensitive element of said compass when turning of the craft occurs on which said compass is mounted, said means comprising a permanent magnet arranged within influencing distance of the magnetic element of said compass, shielding means for said magnet, said magnet and shielding means being relatively movable to vary the linkage of the flux of the permanent magnet field with said compass element, an instrument responsive to turning movement of the craft, and means actuated by said instrument for effecting relative movement of said magnet and shielding means.

3. The combination with a magnetic compass of means for compensating for the northerly turning error effect of the vertical component of the earth's field on the magnetic, field-sensitive element of said compass when turning of the craft occurs on which said compass is mounted, said means comprising a permanent magnet arranged within influencing distance of the magnetic element of said compass, shielding means for said magnet, said magnet and shielding means being relatively movable to vary the linkage of the flux of the permanent magnet field with said compass element, a rate of turn gyro, and means responsive to said rate of turn gyro for effecting relative movement of said magnet and shielding means.

4. The combination with a magnetic compass of means for compensating for the northerly turning error effect of the vertical component of the earth's field on the magnetic, field-sensitive element of said compass when turning of the craft occurs on which said compass is mounted, said means comprising a permanent magnet arranged within influencing distance of the magnetic element of said compass, means for movably supporting said magnet, a magnetic shield fixed with respect to said magnet and arranged to control the linkage of the flux of the permanent magnet field with said compass element, and an instrument responsive to turning movement of the craft operatively connected to said magnet for effecting movement thereof relative to said shield.

5. The combination with a magnetic compass of means for compensating for the northerly turning error effect of the vertical component of the earth's field on the magnetic, field-sensitive element of said compass when turning of the craft occurs on which said compass is mounted, said means comprising a permanent magnet arranged within influencing distance of the magnetic element of said compass, a magnetic shield, means for movably supporting said shield to move relative to said magnet whereby to control the linkage of the flux of the permanent magnet field with said compass, and an instrument responsive to turning movement of the craft operatively connected to said shield for effecting movement thereof.

6. The combination with a magnetic compass of means for compensating for the northerly turning error effect of the vertical component of the earth's field on the magnetic, field-sensitive element of said compass when turning of the craft occurs on which said compass is mounted, said means comprising a pair of permanent magnets arranged with their magnetic axes in substantial alignment and with like poles adjacent each other, shielding means for said magnets, said magnets and shielding means being relatively movable to vary the linkage of the flux of the field of said magnets with said compass element, a rate of turn gyro, and means responsive to said rate of turn gyro for relatively moving said magnets and shielding means an amount dependent upon the rate of turn of said craft.

7. The combination of elements recited in claim 3, together with damping means comprising a cylinder element and piston element therein, said permanent magnet being incorporated at least as a part of one of said damping elements.

8. The combination of elements claimed in claim 2, including a second shielding means having parts defining an adjustable air gap situated between the permanent magnet and the magnetic element of the compass, and means for setting the parts of the second shielding means in accordance with the latitude of the craft.

FRANCIS WEST, Jr.